Patented Oct. 1, 1935

2,015,859

UNITED STATES PATENT OFFICE 2,015,859

FILLER MATERIAL FOR WELDING

Arthur R. Lytle, Flushing, N. Y., assignor to Oxweld Acetylene Company, a corporation of West Virginia No Drawing. Application May 9, 1934,
Serial No. 724,762

2 Claims. (Cl. 75—1)

This invention relates to welding rods or filler metals for use in welding; and more particularly to a novel composition consisting mainly of copper and which is free flowing and will produce sound welds when used as a filler material in fusion welding.

Various deoxidizers have been used to improve the welding quality of copper when the latter is used as filler material in fusion welding. It has been proposed to use silicon or phosphorus for this purpose.

Silicon is quite effective in removing oxides from the weld metal, and welds produced with silicon-containing copper welding rods are generally free from porosity and have good tensile strength. However, when silicon is present in amounts above 0.20%, the molten metal becomes quite sluggish and a heavy slag forms on its surface. The sluggishness of the metal hinders the production of welds of uniform appearance, and the heavy slag requires a considerable amount of flux in order that the welding operation may proceed satisfactorily.

Phosphorus, when used in copper welding rods, removes copper oxide satisfactorily from the weld metal but welds made with such phosphorus-containing rods are often porous and consequently such welds are not entirely satisfactory. The phosphorus has been employed as a deoxidizer but has not been used in combination with another deoxidizer such as silicon.

I have found that a welding rod or filler material consisting predominantly of copper but containing specified small amounts of both silicon and phosphorus, when used for fusion welding, performs very satisfactorily both with respect to its deoxidizing properties and its fluidity and produces sound welds.

The principal object of my invention is to provide a composition for filler material for welding which shall consist predominantly of copper and which shall be more satisfactory than compositions heretofore used, especially with respect to soundness of welds and fluidity of weld metal. This and other objects and novel features of my invention will be evident from the following specification.

In making my improved welding rod or filler material for welding I alloy copper with small amounts of silicon and phosphorus. It has been proposed to add silicon in the past, but when the silicon was present in amounts greater than 0.20% the molten metal became sluggish. I have found that the addition of slight amounts of phosphorus counteracts this tendency to sluggishness. On the other hand the presence of the silicon counteracts the tendency of the phosphorus to impart porosity to the deposited weld metal. My improved welding rod or filler material, mainly of copper, preferably contains from about 0.05% to about 0.30% of phosphorus and from about 0.35% to about 0.60% of silicon. By using these percentages of phosphorus I am enabled to use the higher percentages of silicon without encountering any difficulty in the welding operation due to sluggishness or lack of fluidity of the molten weld metal. If necessary, the amount of silicon may be increased, but ordinarily greater amounts of silicon than 0.60% are not necessary.

It will accordingly be seen that I have devised a composition for filler material for welding which consists predominantly of copper and which produces a weld metal which is free flowing and which gives a deposit of weld metal which is not porous. With my improved filler material excessive amounts of flux are unnecessary.

Although my improved filler material is especially adapted for use in oxy-acetylene welding my invention is not limited to any particular method of welding.

I claim:

1. A filler material for welding characterized by being free flowing and giving a deposit substantially free from pores, consisting principally of copper, phosphorus and silicon, the phosphorus content being substantially between 0.05% and 0.30%, the silicon content being substantially between 0.20% and 0.60%, and the balance copper except for minor constituents insufficient to change said characteristics.

2. Filler material for welding consisting of silicon 0.35% to 0.60% and phosphorus 0.05% to 0.30%, with the remainder substantially all copper.

ARTHUR R. LYTLE.